United States Patent [19]

van der Lely

[11] 4,044,839

[45] Aug. 30, 1977

[54] SOIL CULTIVATING MACHINES

[76] Inventor: Cornelis van der Lely, 7, Bruschenrain, Zug, Switzerland

[21] Appl. No.: 613,903

[22] Filed: Sept. 16, 1975

[30] Foreign Application Priority Data

Sept. 18, 1974 Netherlands .................. 7412331

[51] Int. Cl.² ............................................. A01B 33/06
[52] U.S. Cl. ....................................... 172/49; 172/55; 172/59; 172/68; 172/91; 172/97; 172/111; 172/522
[58] Field of Search ................... 172/35, 48–53, 172/55–57, 59, 60, 68, 91, 92, 97–102, 110, 111, 522–526, 555, 604, 713

[56] References Cited

U.S. PATENT DOCUMENTS

| 75,310 | 3/1868 | Standish | 172/59 X |
|---|---|---|---|
| 534,638 | 2/1895 | Elliott et al. | 172/713 X |
| 661,307 | 11/1900 | Darby et al. | 172/49 |
| 1,113,241 | 10/1914 | Niesz | 172/604 X |
| 2,429,298 | 10/1947 | Savage | 172/91 X |
| 2,619,017 | 11/1952 | Stephenson | 172/91 X |
| 3,130,794 | 4/1964 | Lovell et al. | 172/51 |
| 3,199,607 | 8/1965 | Granius | 172/111 |
| 3,899,030 | 8/1975 | van der Lely et al. | 172/68 |

FOREIGN PATENT DOCUMENTS

| 69,803 | 11/1892 | Germany | 172/526 |
|---|---|---|---|
| 847,413 | 9/1960 | United Kingdom | 172/523 |

Primary Examiner—Paul E. Shapiro
Attorney, Agent, or Firm—Mason, Mason & Albright

[57] ABSTRACT

A soil cultivating machine has side-by-side working members mounted on upwardly extending shafts that extend slightly forward with respect to the direction of travel. Each working member includes radial arms and at the outer end of each arm a tool, such as a disc or group of tines, is journalled for free rotation about a corresponding axis of rotation that extends at an angle with respect to the axis of rotation of the working member. During operation, the tools have portions that contact the ground and cut across the soil while rotating about the tools' axes of rotation and that of the working member. Such movements assist to propel the machine forwardly.

14 Claims, 4 Drawing Figures

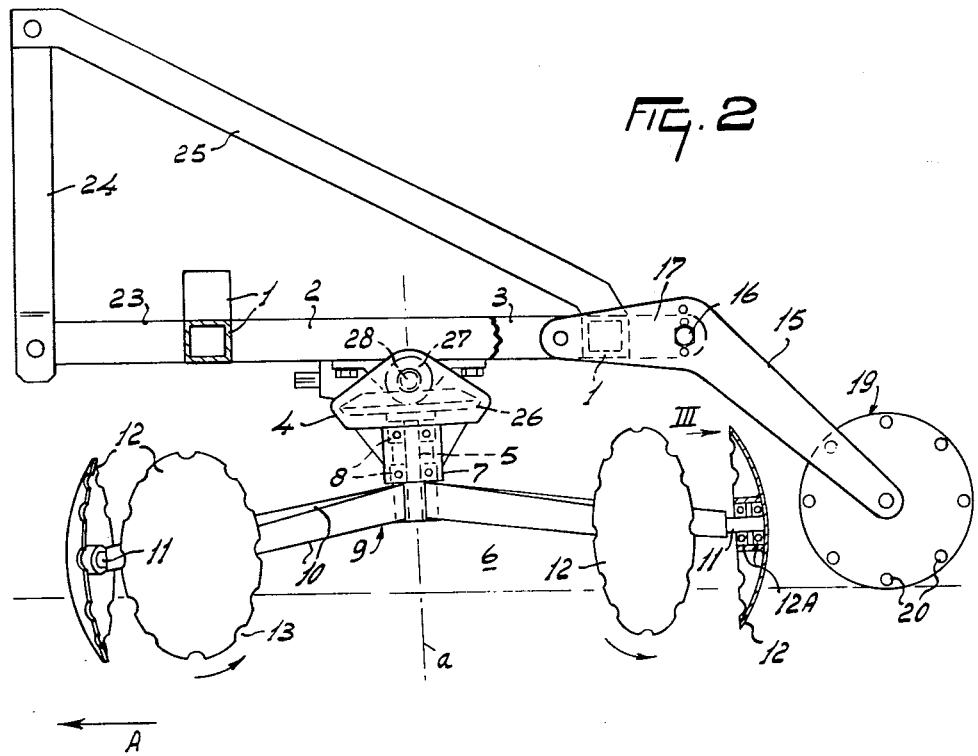
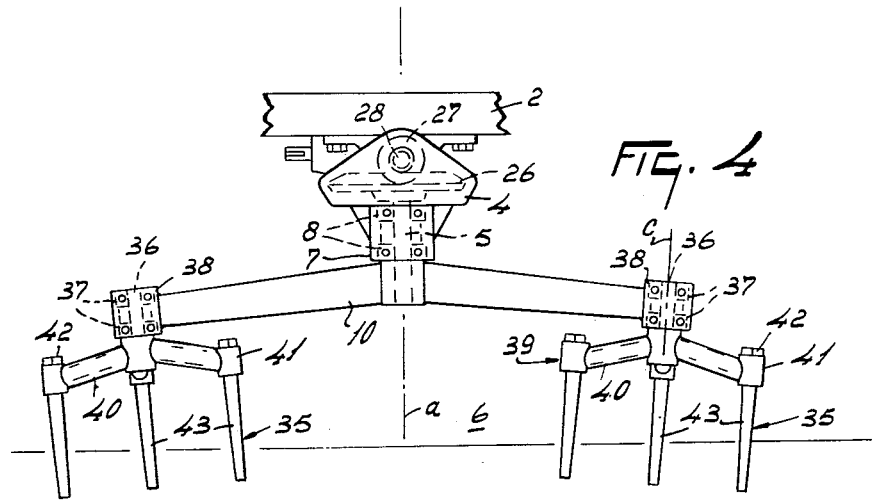

SOIL CULTIVATING MACHINES

According to the present invention there is provided a soil cultivating machine comprising at least one working member arranged to be rotatably driven about an upwardly extending axis and provided with at least one soil cultivating means arranged on the working member and adapted to rotate about an axis at an angle to the rotary axis of the working member. This construction permits of imparting to the soil cultivating means such a movement across the soil to be worked that the soil is effectively loosened and, in addition, weed killing is optimized, the machine thus being able to operate very effectively on fields still having remains of crop and weeds growing among the crop.

Figure 1:
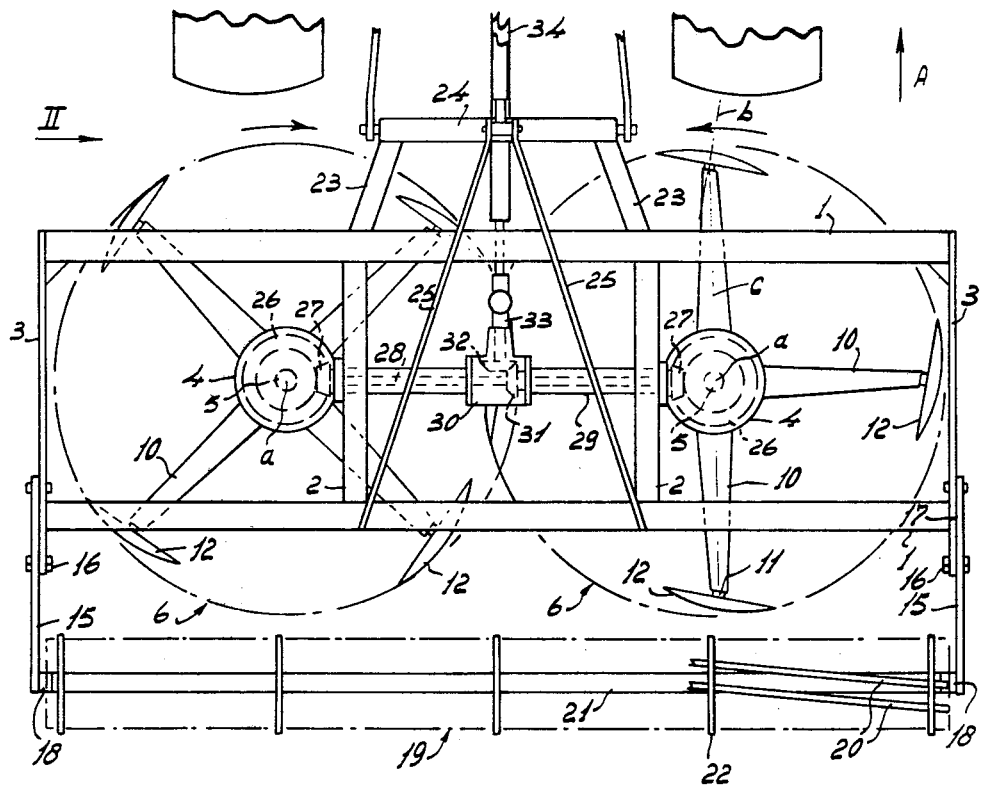
Figure 3:
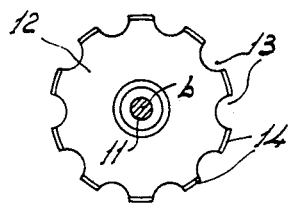

For a better understanding of the invention and to show how the dame may be carried into effect, reference will now be made by way of example to the accompanying drawings in which:

FIG. 1 is a schematic plan view of a soil cultivating machine shown hitched to a tractor, FIG. 2 is an enlarged elevational view taken in the direction of the arrow II in FIG. 1, FIG. 3 is an elevational view in the direction of the arrow III in FIG. 2, FIG. 4 is part of an elevational view in the direction of the arrow II in FIG. 1 but illustrating a second embodiment.

The soil cultivating machine or implement shown in FIGS. 1 to 3 has a frame having two horizontal frame beams 1 spaced apart one behind the other and extending transversely of the intended direction of operative travel A of the machine. The frame beams 1 are parallel to one another and interconnected at equal distances from the center by means of tie beams 2 extending in the direction of travel A. The ends of the frame beams 1 are coupled with one another by means of strips 3, extending in the direction of travel A.

Gear boxes 4 are carried by the outermost lateral faces of the tie beams 2. In each of the gear boxes 4 is journalled a substantially upright shaft 5, the longitudinal centre line $a$ of which constitutes the rotary axis of a working member 6. From FIG. 2 it will be apparent that the gear boxes 4 are arranged so that the shafts 5 are slightly inclined to the front from bottom to top. Below the gear boxes 4 and the shafts 5 are held in sleeves 7 by means of two spaced ball bearings 8 lying one above the other.

The lower end of each shaft 5 carries a support 9 having four straight crosswise arranged arms 10 extending radially from the shaft 5 and tapering towards their outer ends. Viewed in a direction at right angles to the shaft 5, the arms 10 are slightly inclined downwards towards their free ends (see FIG. 4). The end of each arm 10 is provided with a stub shaft 11, the longitudinal center line $b$ of which crosses substantially at right angles the longitudinal center line $a$ of the corresponding shaft 5. The longitudinal center line $b$ of each shaft 11 is at an angle to the longitudinal center line $c$ of the corresponding arm 10 so that away from the fastening points on the respective arms the stub shafts 11 extend to the rear, viewed with respect to the intended direction of operative rotation of the working member (see FIG. 1).

Each stub shaft 11 is provided by means of a ball bearing 12A with a soil cultivating means formed by a hollow disc 12. The hollow side of the disc 12 faces the shaft 5. The discs 12 have at their circumferences equally spaced recesses 13 and the portions 14 located between these recesses 13 have a cutting edge.

At the level of the rearmost frame beam 1 rearwardly extending arms 15 are pivoted to the strips 3. Each arms 15 can be set and fixed in any selected one of a plurality of positions by means of a bolt 16 passed through a hole in strip 3 and a selected one of a plurality of holes in a sector-shaped portion 17 of the arms 15. The free ends of the arms 15 have bearings 18 in which the ends of a substantially horizontal, rotatable working member 19, extending transversely of the direction of travel A, are freely rotatable. The working member 19 is provided at its circumference with elongated elements 20, extending in the direction of the rotary axis of the member 19. The elongated elements 20, preferably formed by circular-section bars, are supported from equally spaced plates 22, arranged on a central, tubular support 21.

At the front the foremost frame beam 1 is provided at the level of the tie beams 2 with forwardly converging supports 23 holding a trestle 24 with the aid of which the machine can be attached, as illustrated, to the three-point lifting device of a tractor. The top of the trestle 24 is connected with the rearmost frame beam 1 by means of supports 25 diverging rearwardly away from the trestle.

Each shaft 5 is drivably connected in its gear box 4 by means of a bevel gear wheel 26 with a bevel gear wheel 27 on a shaft 28 which extends transversely of the direction of travel A and thus parallel to the frame beams 1. The shaft 28 is disposed in a tube 29 having a gear box 30 near its mid-point. Within the gear box 30 the shaft 28 is drivably connected by means of a bevel gear wheel 31 with a bevel gear wheel 32 on a shaft 33, which projects from the front of the gear box 30 and extends substantially in the direction of travel A. The shaft 33 can be connected via an auxilliary shaft 34 and as illustrated with the power take-off shaft of the tractor.

In operation, when the machine is attached by means of the trestle 24 to the three-point lift of the tractor and is moved in the direction of the arrow A, the substantially upright shafts 5 of the working members 6 are rotated in opposite senses by means of the driving mechanism described above, as its indicated by arcuate arrows in FIG. 1. The soil cultivating means formed by the discs 12, which are freely rotatable about the stub shafts 11, are driven in the direction of rotation of their working members so that they work strips of soil which overlap one another, as will be apparent from FIG. 1. Since with respect to the direction of rotation of the working members the discs are arranged so that their leading edge portions are farther remote from the rotary axis of their working member than their trailing edge portions, these discs exert a propelling effect on the machine during their rearward movement so that the tractive force required for moving the machine is reduced. Since the shafts 5 are slightly inclined forwardly in the direction of travel A, the discs 12 when near the front of the working members are, in operation, at a greater depth in the soil than when near the rear. In this way the lower layer of the strip of soil cultivated is crumbled up more coarsely than the upper layer. Since the circumferences of the respective discs have recesses 13, which may be provided like the portions 14, with cutting edges, the machine can be extremely useful on fields still having remains of crop or much weed, since the discs not only cut up these remains but also cover the so cut-up remains. The inclined position of the discs with respect to the path described by them ensures an effective drive of the discs and, in addition, an effective turning-up of the soil, while the discs have a propelling effect on the machine.

In the embodiment shown in FIG. 4 the ends of the arms 10 of the working members are provided with groups of tines 35 forming the soil cultivating means. The groups of tines 35 are adapted to rotate about an upright shaft 36, which is at an acute angle to the rotary shaft of the corresponding working member 6, viewed at right angles to the working member rotary axis a. The top end of the shaft 36 of each group of tines 35 is further remote from the rotary axis a of the corresponding working member than the lower end. Each shaft 36 is rotatably supported by means of two ball bearings 37 spaced apart in overlying position in a sleeve 38 fastened to the end of a corresponding arm 10 and at the lower end the shaft 36 carries a support 39 having three arms 40. The arms 40 extend radially of the shaft 36 and are at circumferential angles of about 120° to one another. Viewed in a direction at right angles to the shaft 36, the arms 40 are slightly inclined downwards from the shaft towards their free ends. At its outer end each arm 40 is provided with a holder 41 receiving a fastening portion 42 of a tine 35, which portion terminates in a downwardly extending operative portion 43. The operative portion 43 is substantially straight and tapers inwardly towards its free end. From FIG. 4 it will be seen that the operative portions 43 of the respective tines 35 are substantially parallel to their rotary shaft 36. The longitudinal center line of each tine fastening portion 42 is at an angle of preferably 8° to the longitudinal center line of the operative portion 43.

In operation the working members 6 of this embodiment are driven about the vertical shafts 5 and during their rotation, which corresponds with that of the working members 6 of the first embodiment, the groups of tines 35 are driven in clockwise direction so that they work overlapping strips of soil. Since the rotary shafts 36 of the soil cultivating means formed by the groups of tines 35, freely rotating viewed in a direction at right angles to the rotary axis a of each working member 6, are at an angle to this rotary axis a so that the top end of such shaft 36 is further remote from the rotary axis a than the lower end, the free ends of the tines 35 are passed across the soil along the paths inclined to the horizontal. The rotary movement of the group of tines is such that the tines can readily dig up weeds and roots from the subsoil, which is extremely important on fields strongly contaminated by weeds such as grasses.

In operation the strip of soil worked by the working members 6 of both emobdiments described is subsequently treated by the elongated elements 20 of the rotatable working member 19 so that the worked soil is engaged and distributed so that a most advantageous seed bed is obtained. By means of the arms 15 the working member 19 can be set and fixed in any selected one of a plurality of positions so that this working member can be used to adjust the effective depth of the soil cultivating means of the respective working members 6.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating machine comprising a frame and at least one soil working member mounted on said frame, said working member being notatable about an upwardly extending axis defined by a shaft and driving means connected to rotate said shaft, tool means being mounted on a support that is positioned outwardly from said shaft and said tool means being freely rotatable about a further upwardly extending axis defined by a second shaft, said second shaft being spaced outwardly a substantial distance from said first mentioned shaft and extending at an angle to the same, the upper end of said second shaft being located further from first mentioned shaft than the lower end thereof, and said tool means being passed across the ground in a circular path inclined to the horizontal during the operative rotation of the soil working member.

2. A soil cultivating machine as claimed in claim 1, wherein the support of said soil working member includes a plurality of arms with tool means on each of said arms.

3. A soil cultivating machine as claimed in claim 2, wherein said arms are straight and extend substantially radially from said first mentioned shaft.

4. A soil cultivating machine as claimed in claim 3, wherein, viewed in a direction at right angles to said first mentioned axis, said arms extend slightly downwards from that axis to outer free ends and said further axis extends at an angle to the longitudinal center line of one arm.

5. A soil cultivating machine as claimed in claim 4, wherein said further axis extends substantially perpendicular to the longitudinal center line of said arm.

6. A soil cultivating machine as claimed in claim 2, wherein tool means are mounted at outer ends of said arms.

7. A soil cultivating machine as claimed in claim 1, wherein said tool means comprises a group of tines that is rotated about a central shaft and said support is journalled to said central shaft.

8. A soil cultivating machine as claimed in claim 7, wherein said group of tines comprises support arms and a tine at the outer end of each support arm.

9. A soil cultivating machine as claimed in claim 8, wherein there are three support arms for each group of tines and said support arms, when viewed in a direction parallel to said further axis, being at least substantially rectilinear, when viewed at right angles to said further axis, extending downwards from said second shaft towards respective outer free ends.

10. A soil cultivating machine as claimed in claim 8, wherein each tine is mounted in a corresponding holder on the outer end of a support arm and said tine comprises a straight, downwardly tapering, operative portion.

11. A soil cultivating machine as claimed in claim 1, wherein, with respect to the normal direction of travel, an elongated further soil working member is pivoted to the frame and positioned behind the soil cultivating member with respect to the direction of travel, said elongated member comprising a plurality of elongated elements that are mounted to rotate about a substantially horizontal axis and said axis extending transversely of the direction of travel.

12. A soil cultivating machine as claimed in claim 11, wherein said elongated elements extend in helical arrangement along the circumference of said working member.

13. A soil cultivating machine as claimed in claim 11, wherein said further working member is pivoted to said frame with arms and adjusting means that interconnects said frame to said further member, the latter being a roller that is adjustable in a direction of height and fixable in any selected one of a plurality of positions relative to the frame.

14. A soil cultivating machine comprising a frame and two soil working members rotatably mounted side-by-side on corresponding upwardly extending axes defined by respective shafts on said frame, driving means connected to rotate said shafts in relative opposite directions and said soil working members being positioned to work overlapping strips of soil, each soil working member comprising support means that extends outwardly from its respective shaft, and at least one tool that is freely rotatable about a further upwardly extending axis defined by a second shaft, said second shaft being journalled on said support means and spaced from said respective shaft, said second shaft extending at an angle to the first mentioned shaft and the upper end of the second shaft being located further from its corresponding axis than the lower end thereof, said tool being moved across the ground in a circular path inclined to the horizontal during the operative rotation of the soil working member.

* * * * *